United States Patent
Scordilis-Kelley et al.

(10) Patent No.: US 9,577,267 B2
(45) Date of Patent: Feb. 21, 2017

(54) ELECTRODE STRUCTURE AND METHOD FOR MAKING SAME

(71) Applicants: Sion Power Corporation, Tucson, AZ (US); BASF SE, Ludwigshafen (DE)

(72) Inventors: Chariclea Scordilis-Kelley, Tucson, AZ (US); Ruediger Schmidt, Paderborn (DE); Holger Schneider, Ludwigshafen (DE); Tracy Earl Kelley, Tucson, AZ (US); Savannah V. Burnside-Joubert, San Jose, CA (US); Klaus Leitner, Ludwigshafen (DE); Heino Sommer, Eggenstein-Leopoldshafen (DE); Jan Tomforde, Limburgerhof (DE); Alexander Panchenko, Ludwigshafen (DE)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 61 days.

(21) Appl. No.: 14/743,304

(22) Filed: Jun. 18, 2015

(65) Prior Publication Data
US 2015/0287998 A1 Oct. 8, 2015

Related U.S. Application Data

(63) Continuation of application No. PCT/EP2013/076066, filed on Dec. 10, 2013.
(Continued)

(51) Int. Cl.
*H01M 4/1397* (2010.01)
*H01M 4/70* (2006.01)
(Continued)

(52) U.S. Cl.
CPC ............... *H01M 4/70* (2013.01); *H01M 4/139* (2013.01); *H01M 4/38* (2013.01); *H01M 4/382* (2013.01);
(Continued)

(58) Field of Classification Search
CPC . H01M 4/8605; H01M 4/8636; H01M 4/5815
See application file for complete search history.

(56) References Cited

U.S. PATENT DOCUMENTS 3,716,409 A 2/1973 Cairns et al.
3,833,421 A 9/1974 Rubischko et al.
(Continued)

FOREIGN PATENT DOCUMENTS

CN 1534811 A 10/2004
CN 1574427 A 2/2005
(Continued)

OTHER PUBLICATIONS

International Search Report and Written Opinion for PCT/EP2013/076066 dated Apr. 4, 2014.
(Continued)

*Primary Examiner* — Stewart Fraser
*Assistant Examiner* — Olatunji Godo
(74) *Attorney, Agent, or Firm* — Wolf, Greenfield & Sacks, P.C.

(57) ABSTRACT

Electrode structures and methods for making the same are generally described. In certain embodiments, the electrode structures can include a plurality of particles, wherein the particles comprise indentations relative to their convex hulls. As the particles are moved proximate to or in contact with one another, the indentations of the particles can define pores between the particles. In addition, when particles comprising indentations relative to their convex hulls are moved relative to each other, the presence of the indenta-
(Continued)

tions can ensure that complete contact does not result between the particles (i.e., that there remains some space between the particles) and that void volume is maintained within the bulk of the assembly. Accordingly, electrodes comprising particles with indentations relative to their convex hulls can be configured to withstand the application of a force to the electrode while substantially maintaining electrode void volume (and, therefore, performance). Particles having indentations relative to their convex hulls also occupy a relatively small volume, compared to spheres or other particles including boundaries that fill substantially all of their convex hulls, allowing one to introduce a desired amount of void volume while reducing the percentage of volume within the electrode occupied by particulate material.

15 Claims, 7 Drawing Sheets

Related U.S. Application Data

(60) Provisional application No. 61/739,350, filed on Dec. 19, 2012.

(51) Int. Cl.
| | | |
|---|---|---|
| *H01M 4/58* | (2010.01) | |
| *H01M 4/62* | (2006.01) | |
| *H01M 4/66* | (2006.01) | |
| *H01M 10/052* | (2010.01) | |
| *H01M 4/139* | (2010.01) | |
| *H01M 4/38* | (2006.01) | |
| *H01M 4/60* | (2006.01) | |

(52) U.S. Cl.
CPC .......... *H01M 4/581* (2013.01); *H01M 4/602* (2013.01); *H01M 4/625* (2013.01); *H01M 4/626* (2013.01); *H01M 4/661* (2013.01); *H01M 4/663* (2013.01); *H01M 10/052* (2013.01); *H01M 2220/10* (2013.01); *H01M 2220/20* (2013.01); *H01M 2220/30* (2013.01); *Y02E 60/122* (2013.01)

(56) References Cited

U.S. PATENT DOCUMENTS

| | | |
|---|---|---|
| 3,859,139 A | 1/1975 | Dews et al. |
| 3,907,579 A | 9/1975 | Ravault |
| 3,951,689 A | 4/1976 | Ludwig |
| 4,011,374 A | 3/1977 | Kaun |
| 4,169,120 A | 9/1979 | Miller |
| 4,184,013 A | 1/1980 | Weddigen et al. |
| 4,235,528 A | 11/1980 | Yano et al. |
| 4,337,140 A | 6/1982 | Solomon |
| 4,339,325 A | 7/1982 | Solomon et al. |
| 4,384,029 A | 5/1983 | Kordesch et al. |
| 4,410,609 A | 10/1983 | Peled et al. |
| 4,556,618 A | 12/1985 | Shia |
| 4,624,902 A | 11/1986 | DeNeufville et al. |
| 4,664,991 A | 5/1987 | Perichaud et al. |
| 4,677,415 A | 6/1987 | Howng |
| 4,683,178 A | 7/1987 | Stadnick et al. |
| 4,720,400 A | 1/1988 | Manniso |
| 4,739,018 A | 4/1988 | Armand et al. |
| 4,770,956 A | 9/1988 | Knoedler |
| 4,833,048 A | 5/1989 | Dejonghe et al. |
| 4,917,974 A | 4/1990 | De Jonghe et al. |
| H858 H | 12/1990 | Leonard et al. |
| 5,126,082 A | 6/1992 | Frank |
| 5,162,175 A | 11/1992 | Visco et al. |
| 5,194,341 A | 3/1993 | Bagley et al. |
| 5,290,414 A | 3/1994 | Marple |
| 5,324,599 A | 6/1994 | Oyama et al. |
| 5,328,946 A | 7/1994 | Tuminello et al. |
| 5,433,917 A | 7/1995 | Srivastava et al. |
| 5,441,831 A | 8/1995 | Okamoto et al. |
| 5,462,566 A | 10/1995 | Skotheim |
| 5,516,598 A | 5/1996 | Visco et al. |
| 5,529,860 A | 6/1996 | Skotheim et al. |
| 5,538,812 A | 7/1996 | Lee et al. |
| 5,582,623 A | 12/1996 | Chu |
| 5,601,947 A | 2/1997 | Skotheim et al. |
| 5,648,187 A | 7/1997 | Skotheim |
| 5,686,201 A | 11/1997 | Chu |
| 5,690,702 A | 11/1997 | Skotheim et al. |
| 5,698,339 A | 12/1997 | Kawakami et al. |
| 5,723,230 A | 3/1998 | Naoi et al. |
| 5,783,330 A | 7/1998 | Naoi et al. |
| 5,792,575 A | 8/1998 | Naoi et al. |
| 5,814,420 A | 9/1998 | Chu |
| 5,861,222 A | 1/1999 | Fischer et al. |
| 5,882,812 A | 3/1999 | Visco et al. |
| 5,882,819 A | 3/1999 | Naoi et al. |
| 5,895,732 A | 4/1999 | Clough |
| 5,919,587 A | 7/1999 | Mukherjee et al. |
| 5,961,672 A | 10/1999 | Skotheim et al. |
| 5,989,467 A | 11/1999 | Daws et al. |
| 6,030,720 A | 2/2000 | Chu et al. |
| 6,110,417 A | 8/2000 | Sugikawa |
| 6,110,621 A | 8/2000 | Sandi et al. |
| 6,117,590 A | 9/2000 | Skotheim et al. |
| 6,143,216 A | 11/2000 | Loch et al. |
| 6,153,337 A | 11/2000 | Carlson et al. |
| 6,165,645 A | 12/2000 | Nishimura et al. |
| 6,168,694 B1 | 1/2001 | Huang et al. |
| 6,168,886 B1 | 1/2001 | Clough |
| 6,194,099 B1 | 2/2001 | Gernov et al. |
| 6,201,100 B1 | 3/2001 | Gorkovenko et al. |
| 6,203,947 B1 | 3/2001 | Peled et al. |
| 6,225,002 B1 | 5/2001 | Nimon et al. |
| 6,306,545 B1 | 10/2001 | Carlson et al. |
| 6,312,853 B1 | 11/2001 | Zhang et al. |
| 6,358,643 B1 | 3/2002 | Katz et al. |
| 6,403,261 B2 | 6/2002 | Mitkin et al. |
| 6,492,064 B1 | 12/2002 | Smart et al. |
| 6,528,211 B1 | 3/2003 | Nishimura et al. |
| 6,544,688 B1 | 4/2003 | Cheng |
| 6,558,847 B1 | 5/2003 | Kawakami et al. |
| 6,680,013 B1 | 1/2004 | Stein et al. |
| 6,753,036 B2 | 6/2004 | Jankowski et al. |
| 6,913,856 B2 | 7/2005 | Nirasawa et al. |
| 6,913,998 B2 | 7/2005 | Jankowski et al. |
| 7,019,494 B2 | 3/2006 | Mikhaylik |
| 7,029,796 B2 | 4/2006 | Choi et al. |
| 7,157,185 B2 | 1/2007 | Marple |
| 7,244,530 B2 | 7/2007 | Hambitzer et al. |
| 7,247,408 B2 | 7/2007 | Skotheim et al. |
| 7,250,233 B2 | 7/2007 | Choi et al. |
| 7,354,675 B2 | 4/2008 | Molter |
| 7,361,431 B2 | 4/2008 | Kim et al. |
| 7,553,584 B2 | 6/2009 | Chiang et al. |
| 7,579,112 B2 | 8/2009 | Chiang et al. |
| 7,695,861 B2 | 4/2010 | Kolosnitsyn et al. |
| 7,771,870 B2 | 8/2010 | Affinito et al. |
| 8,087,309 B2 | 1/2012 | Kelley et al. |
| 8,137,525 B1 | 3/2012 | Harreld et al. |
| 9,005,809 B2 | 4/2015 | Wilkening et al. |
| 9,034,421 B2 | 5/2015 | Mikhaylik et al. |
| 2001/0024749 A1 | 9/2001 | Michot et al. |
| 2001/0034934 A1 | 11/2001 | Xu et al. |
| 2001/0041283 A1 | 11/2001 | Hitomi |
| 2002/0009626 A1 | 1/2002 | Terazono et al. |
| 2002/0018933 A1 | 2/2002 | Mitkin et al. |
| 2002/0106561 A1 | 8/2002 | Lee et al. |
| 2002/0192557 A1 | 12/2002 | Choi et al. |
| 2003/0073000 A1 | 4/2003 | Lee et al. |
| 2003/0082446 A1 | 5/2003 | Chiang et al. |
| 2003/0099884 A1 | 5/2003 | Chiang et al. |
| 2003/0108785 A1 | 6/2003 | Wu et al. |
| 2003/0113622 A1 | 6/2003 | Blasi et al. |

(56) References Cited

U.S. PATENT DOCUMENTS

| | | |
|---|---|---|
| 2003/0113624 A1 | 6/2003 | Kim et al. |
| 2003/0124416 A1 | 7/2003 | Kaneta |
| 2003/0124427 A1 | 7/2003 | Takeuchi et al. |
| 2003/0129500 A1 | 7/2003 | Gan et al. |
| 2003/0180611 A1 | 9/2003 | Mikhaylik et al. |
| 2003/0215714 A1 | 11/2003 | Barker et al. |
| 2003/0222048 A1 | 12/2003 | Asakawa et al. |
| 2003/0228518 A1 | 12/2003 | Marple |
| 2003/0228524 A1 | 12/2003 | Heider et al. |
| 2004/0037771 A1 | 2/2004 | Meissner et al. |
| 2004/0047798 A1 | 3/2004 | Oh et al. |
| 2004/0058246 A1 | 3/2004 | Choi et al. |
| 2004/0118698 A1 | 6/2004 | Lu et al. |
| 2004/0191607 A1 | 9/2004 | Nobuta et al. |
| 2004/0202936 A1 | 10/2004 | Mikhaylik |
| 2004/0234851 A1 | 11/2004 | Kim et al. |
| 2004/0265672 A1 | 12/2004 | Wei |
| 2005/0008938 A1 | 1/2005 | Cho et al. |
| 2005/0048371 A1 | 3/2005 | Nagayama et al. |
| 2005/0156575 A1 | 7/2005 | Mikhaylik |
| 2005/0158535 A1 | 7/2005 | Zhang et al. |
| 2005/0169829 A1 | 8/2005 | Dai et al. |
| 2005/0175904 A1 | 8/2005 | Gorkovenko |
| 2005/0181269 A1 | 8/2005 | Eshraghi et al. |
| 2005/0234177 A1 | 10/2005 | Zaghib et al. |
| 2005/0266990 A1 | 12/2005 | Iwasaki et al. |
| 2006/0024579 A1 | 2/2006 | Kolosnitsyn et al. |
| 2006/0029864 A1* | 2/2006 | Matsumoto ........... H01M 4/244 429/223 |
| 2006/0046926 A1 | 3/2006 | Ji et al. |
| 2006/0115579 A1 | 6/2006 | Mukherjee et al. |
| 2006/0193889 A1 | 8/2006 | Spradlin et al. |
| 2006/0194096 A1 | 8/2006 | Valle et al. |
| 2006/0234117 A1 | 10/2006 | Fujikawa et al. |
| 2006/0238203 A1 | 10/2006 | Kelley et al. |
| 2007/0065701 A1 | 3/2007 | Cable et al. |
| 2007/0065724 A1 | 3/2007 | Barker et al. |
| 2007/0207370 A1 | 9/2007 | Kwak et al. |
| 2007/0221265 A1 | 9/2007 | Affinito et al. |
| 2007/0224502 A1 | 9/2007 | Affinito et al. |
| 2008/0100264 A1 | 5/2008 | Kolosnitsyn et al. |
| 2008/0187663 A1 | 8/2008 | Affinito |
| 2008/0246580 A1 | 10/2008 | Braun et al. |
| 2008/0318128 A1 | 12/2008 | Simoneau et al. |
| 2009/0053607 A1 | 2/2009 | Jeong et al. |
| 2009/0077794 A1 | 3/2009 | Hirakawa et al. |
| 2009/0098457 A1 | 4/2009 | Kwon et al. |
| 2009/0159853 A1 | 6/2009 | Sengupta et al. |
| 2009/0200986 A1 | 8/2009 | Kopera et al. |
| 2009/0291368 A1 | 11/2009 | Newman et al. |
| 2009/0311604 A1 | 12/2009 | Nazar et al. |
| 2010/0035128 A1 | 2/2010 | Scordilis-Kelley et al. |
| 2010/0068623 A1 | 3/2010 | Braun et al. |
| 2010/0129699 A1 | 5/2010 | Mikhaylik et al. |
| 2010/0143823 A1 | 6/2010 | Tanaka et al. |
| 2010/0239914 A1 | 9/2010 | Mikhaylik et al. |
| 2011/0006738 A1 | 1/2011 | Mikhaylik et al. |
| 2011/0008531 A1 | 1/2011 | Mikhaylik et al. |
| 2011/0045346 A1 | 2/2011 | Chiang et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0117359 A1 | 5/2011 | de Santos Avila et al. |
| 2011/0129723 A1 | 6/2011 | Tsuchida |
| 2011/0165466 A1 | 7/2011 | Zhamu et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0028128 A1 | 2/2012 | Seino et al. |
| 2012/0048729 A1 | 3/2012 | Mikhaylik et al. |
| 2012/0070746 A1 | 3/2012 | Mikhaylik et al. |
| 2012/0301387 A1 | 11/2012 | Neumann |
| 2013/0017441 A1 | 1/2013 | Affinito et al. |
| 2013/0095380 A1 | 4/2013 | Affinito et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0316072 A1 | 11/2013 | Scordilis-Kelley et al. |
| 2014/0099536 A1 | 4/2014 | Sun et al. |
| 2015/0155550 A1 | 6/2015 | Wilkening et al. |

FOREIGN PATENT DOCUMENTS

| | | |
|---|---|---|
| CN | 1845364 A | 10/2006 |
| CN | 1323445 C | 6/2007 |
| CN | 101026247 A | 8/2007 |
| CN | 100355123 C | 12/2007 |
| DE | 10 2011 016 468 B3 | 2/2012 |
| EP | 0 700 109 A1 | 3/1996 |
| EP | 1 324 409 A2 | 7/2003 |
| EP | 1 427 039 A2 | 6/2004 |
| GB | 1 011 353 A | 11/1965 |
| GB | 1 396 062 A | 5/1975 |
| GB | 2 483 372 A | 3/2012 |
| JP | H05-325978 A | 12/1993 |
| JP | H06-124700 A | 5/1994 |
| JP | H09-147868 A | 6/1997 |
| JP | H10-55823 A | 2/1998 |
| JP | H10-214638 A | 8/1998 |
| JP | H11-121045 A | 4/1999 |
| JP | H11-176423 A | 7/1999 |
| JP | H11-219731 A | 8/1999 |
| JP | 2000-268873 A | 9/2000 |
| JP | 2001-093577 A | 4/2001 |
| JP | 2001-143757 A | 5/2001 |
| JP | 2001-527275 A | 12/2001 |
| JP | 2002-203542 A | 7/2002 |
| JP | 2002-367678 A | 12/2002 |
| JP | 2003-514356 A | 4/2003 |
| JP | 2003-193110 A | 7/2003 |
| JP | 2003-197196 A | 7/2003 |
| JP | 2003-297431 A | 10/2003 |
| JP | 2003-303588 A | 10/2003 |
| JP | 2004-119367 A | 4/2004 |
| JP | 2004-213902 A | 7/2004 |
| JP | 2005-056701 A | 3/2005 |
| JP | 2005-063848 A | 3/2005 |
| JP | 2005-251429 A | 9/2005 |
| JP | 2005-310836 A | 11/2005 |
| JP | 2005-353452 A | 12/2005 |
| JP | 2006-092881 A | 4/2006 |
| JP | 2006-092885 A | 4/2006 |
| JP | 2006-093066 A | 4/2006 |
| JP | 2006-143478 A | 6/2006 |
| JP | 2006-310033 A | 11/2006 |
| JP | 2006-313737 A | 11/2006 |
| JP | 2006-318892 A | 11/2006 |
| JP | 2007-091511 A | 4/2007 |
| JP | 2007-234338 A | 9/2007 |
| JP | 2009-076260 A | 4/2009 |
| JP | 2009-104902 A | 5/2009 |
| JP | 2010-009856 A | 1/2010 |
| JP | 2011-518743 A | 6/2011 |
| KR | 10-2001-0031037 | 4/2001 |
| KR | 10-2001-0098648 | 11/2001 |
| KR | 10-0436712 B1 | 6/2004 |
| KR | 10-0484642 B1 | 4/2005 |
| WO | WO 99/33125 A1 | 7/1999 |
| WO | WO 99/33130 A1 | 7/1999 |
| WO | WO 2007/028972 A1 | 3/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2011/092149 A2 | 8/2011 |

(56) References Cited

FOREIGN PATENT DOCUMENTS

| | | |
|---|---|---|
| WO | WO 2012/027457 A2 | 3/2012 |
| WO | WO 2012/165884 A2 | 12/2012 |

OTHER PUBLICATIONS

International Preliminary Report on Patentability for PCT/EP2013/076066 dated Nov. 14, 2014.
[No Author Listed] Porocarb® HD3—Porous Carbon for Electrochemistry Applications. Heraeus Brochure. Jun. 2013.
Affinito et al., Increasing Li—S Battery Life, and Improving Safety, through Application or a Variety of Coating Techniques. Society of Vacuum Coaters $54^{th}$ Annual Technical Conference Proceedings. Apr. 16-21, 2011.
Barchasz et al., Novel positive electrode architecture for rechargeable lithium/sulfur batteries. Journal of Power Sciences. Aug. 1, 2012;211:19-26.
Choi et al., Challenges facing lithium batteries and electrical double-layer capacitors. Angew Chem Int Ed Engl. Oct. 1, 2012;51(40):9994-10024. doi: 10.1002/anie.201201429. Epub Sep. 10, 2012.
Ding et al., Encapsulating sulfur into hierarchically ordered porous carbon as a high-performance cathode for lithium-sulfur batteries. Chemistry. Jan. 14, 2013;19(3):1013-9. doi: 10.1002/chem. 201202127. Epub Nov. 23, 2012.
Kim et al., An Advanced Lithium-Sulfur Battery. Advanced Functional Materials. 2013;23:1076-80.
Rao et al., Porous carbon-sulfur composite cathode for lithium-sulfur batteries. Electrochemistry Communications. 2012;17:1-5.
Schuster et al., Spherical ordered mesoporous carbon nanoparticles with high porosity for lithium-sulfur batteries. Angew Chem Int Ed Engl. Apr. 10, 2012;51(15):3591-5. doi: 10.1002/anie.201107817. Epub Mar. 1, 2012.
Wang et al., A microporous-mesoporous carbon with graphitic structure for a high-rate stable sulfur cathode in carbonate solvent-based Li—S batteries. Phys Chem Chem Phys. Jun. 28, 2012;14(24):8703-10. doi: 10.1039/c2cp40808b. Epub May 22, 2012.
Zhang et al., Confining sulfur in double-shelled hollow carbon spheres for lithium-sulfur batteries. Angew Chem Int Ed Engl. Sep. 17, 2012;51(38):9592-5. doi: 10.1002/anie.201205292. Epub Aug. 17, 2012.
Ahn, et al., "Electrochemical Properties of Sulfur with Various Particle Size for Lithium Sulfur Batteries" Proceedings of the Power Sources Conference (2010), 44th, 130-133 CODEN: PPOCFD.
Aurbach, D. et al. "Recent studies on the correlation between surface chemistry, morphology, three-dimensional structures and performance of Li and Li—C intercalation anodes in several important electrolyte systems," Journal of Power Sources, 1997, 68:91-98.
Brunauer et al., Adsorption of Gases in Multimolecular Layers. J Am Chem Soc. 1938;60(2):309-19.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Elazari et al. Morphological and structural studies of composite sulfur electrodes upon cycling by HRTEM, AFM and Raman spectroscopy. Journal of the Electrochemical Society. 2010; 157(10):A1131-A1138.
Garboczi, Permeability, diffusivity, and microstructural parameters: A critical review. Cement and Concrete Res. Jul. 1990;20(4):591-601.
Gonzenbach et al., Macroporous ceramics from particle-stabilized wet foams. J Am Ceram Soc. 2007;90(1):16-22.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
He et al., Distribution of sulphur and electrochemical properties of nickel sulphur coatings electrodeposited on the nickel foam as hydrogen evolution reaction cathodes. Material Letters. Aug. 15, 2005; 59:3968-3972.
Ji et al., A highly ordered nanostructured carbon-sulphur cathode for lithium-sulphur batteries. Nature Mater. May 17, 2009;8(6):500-06.
Jun et al., Synthesis of New, Nanoporous Carbon with Hexagonally Ordered Mesostructure. JACS 2000;112(43):10712-3. doi: 10.1021/ja002261e.
Kim et al., Correlation between positive-electrode morphology and sulfur utilization in lithium-sulfur battery. J Power Sources. May 20, 2004;132(1-2):209-12.
Kulinowski et al., Porous metals from colloidal templates. Adv Mater. 2000;12(11): 833-38.
Lai et al., Synthesis and Electrochemical Performance of Sulfur/Highly Porous Carbon Composites. J. Phys. Chem. C 2009, 113, 4712-4716.
Mikhaylik et al., 380 Wh/kg Rechargeable Li/S Batteries Operating at 90% of Sulfur Utilization. $206^{th}$ Meeting of the Electrochemical Society. Honolulu, Hawaii. Oct. 3-8, 2004. Abst. 443.
Mikhaylik et al., Polysulfide Shuttle Study in the Li/S Battery System. J Electrochem Soc. 2004;151:A1969-76.
Peer, Tef_methy_ethyl. Accessed online at peer.tamu.edu/curriculum_modules/properties/module_3/Tef_methyl_ethyl.htm. Last accessed May 31, 2013. 1 page.
Probst et al., Structure and electrical properties of carbon black. Carbon. Feb. 2002;40(2):201-5.
Rauh et al., A Lithium/Dissolved Sulfur Battery with an Organic Electrolyte. J Electrochem Soc. 1979;126:523-27.
Ravikrishna et al., Low-temperature synthesis of porous hydroxyapatite scaffolds using polyaphron templates. J Sol-Gel Sci Techn. Apr. 2006;38(2):203-10.
Ronci et al., A novel approach to in situ diffractometry of intercalation materials: the EDXD technique. Preliminary results on $LiNi_{0.8}Co_{0.2}O_2$. Electrochem Solid-State Lett. 2000;3(4):174-7.
Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Shim et al., The Lithium/Sulfur Rechargeable Cell. Effects of Electrode Composition and Solvent on Cell Performance. J Electrochem Soc. 2002;149:A1321-25.
Shin et al., Characterization of N-Methyl-N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Takeuchi et al., Preparation of electrochemically active lithium sulfide-carbon composites using spark-plasma-sintering process. Journal of Power Sources 195 (2010) 2928-2934.
Wang et al., Electrochemical characteristics of sulfur composite cathode materials in rechargeable lithium batteries. J Power Sources. Nov. 15, 2004;138(1-2):271-73.
Wang et al., Polymer lithium cells with sulfur composites as cathode materials. Electrochimica Acta 48 (2003) 1861-1867.
Wang et al., Sulfur-carbon nano-composite as cathode for rechargeable lithium battery based on gel electrolyte. Electrochem Comm. 2002;4(6):499-502.

(56) References Cited

OTHER PUBLICATIONS

Woo et al., Preparation and characterization of three demensionally ordered macroporous $Li_4Ti_5O_{12}$ anode for lithium batteries. Electrochimica Acta. 2007;53(1):79-82.

Yuan et al., Improvement of cycle property of sulfur-coated multi-walled carbon nanotubes composite cathode for lithium/sulfur batteries. J Power Sources. Apr. 15, 2009;189(2):1141-46.

Zhang et al., A three-dimensional tin-coated nanoporous copper for lithium-ion battery anodes. Journal of Power Sources. 2011; 196:6915-6919.

Zhang et al., Dual-scale porous electrodes for solid oxide fuel cells from polymer foams. Adv Mater. 2005;17(4):487-91.

Zhang et al., Enhancement of long stability of sulfur cathode by encapsulating sulfur into micropores of carbon spheres. Energy & Environmental Science. 2010, 3, 1531-1537.

Zhang et al., Novel Nanosized Adsorbing Composite Cathode Materials for the Next Generational Lithium Battery. Journal of Wuhan University of Technology—Mater. Sci. Ed. 2007;22(2):234-39.

Zhang et al., Three-dimensional ordered macroporous platinum-based electrode for methanol oxidation. Chinese Sci Bulletin. Jan. 2006;51(1):19-24.

Zheng et al., Electrochemical properties of rechargeable lithium batteries with sulfur-containing composite cathode materials. Electrochem Solid-State Lett., May 12, 2006; 9(7):A364-A367.

Zheng et al., Li[Ni1/3Mn1/3Co1/3]O2-based electrodes for PHEV applications: an optimization. ECS Transactions. 2008;11(32): 1-9.

Zheng et al., Novel nanosized adsorbing sulfur composite cathode materials for the advanced secondary lithium batteries. Electrochimica Acta. Jan. 5, 2006;51(7):1330-35.

\* cited by examiner

ELECTRODE STRUCTURE AND METHOD FOR MAKING SAME

RELATED APPLICATIONS

This application is a continuation of International Patent Application No. PCT/EP2013/076066, with an international filing date of Dec. 10, 2013, and entitled "ELECTRODE STRUCTURE AND METHOD FOR MAKING SAME," which claims priority under 35 U.S.C. §119(e) to U.S. Provisional Patent Application No. 61/739,350, filed Dec. 19, 2012, and entitled "ELECTRODE STRUCTURE AND METHOD FOR MAKING SAME." Each of these applications is incorporated herein by reference in its entirety for all purposes.

TECHNICAL FIELD

Electrode structures and methods for making the same are generally described. In certain embodiments, the electrode structures can include a plurality of particles comprising indentations relative to their convex hulls.

BACKGROUND

Electrochemical cells store energy by separating an ion source and an ion sink at differing electrochemical potential. A typical electrochemical cell has a cathode and an anode which participate in an electrochemical reaction to produce power. Ions can be transported via an electrolyte in communication with the anode and the cathode. In many electrochemical cells, it is important to maintain a sufficient level of void volume within one or both electrodes, in order to ensure that electrolyte can access the electrode active material within the electrode(s).

SUMMARY

Electrode structures and methods for making the same are generally described. In certain embodiments, the electrode structures can include a plurality of particles comprising indentations relative to their convex hulls. The subject matter of the present invention involves, in some cases, interrelated products, alternative solutions to a particular problem, and/or a plurality of different uses of one or more systems and/or articles.

In one aspect, an electrode for use in an electrochemical cell is described. In certain embodiments, the electrode comprises an assembly of particles defining a porous support structure, wherein each particle in the assembly of particles has a geometric particle volume, the assembly of particles has a total geometric particle volume defined by the sum of each of the individual geometric particle volumes, each particle in the assembly of particles has a convex hull defining a convex hull volume, and at least about 50% of the total geometric particle volume is made up of particles that have at least one indentation such that, for each such particle, the geometric particle volume is less than about 75% of the convex hull volume of the particle. In certain embodiments, an electrode active material is substantially contained within pores of the porous support structure.

Electrochemical cells comprising the electrodes described herein are also provided.

Also provided are inventive methods for making the electrodes and electrochemical cells described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Electrode structures and methods for making the same are generally described. In certain embodiments, the electrode structures can include a plurality of particles, wherein the particles comprise indentations relative to their convex hulls. As the particles are moved proximate to or in contact with one another, the indentations of the particles can define pores between the particles. In addition, when particles comprising indentations relative to their convex hulls are moved relative to each other, the presence of the indentations can ensure that complete contact does not result between the particles (i.e., that there remains some space between the particles) and that void volume is maintained within the bulk of the assembly. Accordingly, electrodes comprising particles with indentations relative to their convex hulls can be configured to withstand the application of a force to the electrode while substantially maintaining electrode void volume (and, therefore, performance). Particles having indentations relative to their convex hulls also occupy a relatively small volume, compared to spheres or other particles including boundaries that fill substantially all of their convex hulls, allowing one to introduce a desired amount of void volume while reducing the percentage of volume within the electrode occupied by particulate material.

The "convex hull" of an article (e.g., a particle) is used herein to describe the surface that bounds the smallest theoretical volume in which the entirety of any line segment extending from any first point in or on the article to any second point in or on the article falls inside the theoretical volume, i.e., the "convex hull volume." The convex hull volume of an article can be thought of as being similar to the volume that would be defined by wrapping the article tautly in a flexible sheet of material. An indentation relative to the convex hull is formed any time the geometric particle volume occupies a volume that is smaller than the convex hull volume; in such cases, the indentation corresponds to the volume that is occupied by the convex hull that is not occupied by the geometric particle volume. The degree to which a particle contains indentations relative to its convex hull can be quantified by dividing the geometric particle volume by the particle's convex hull volume, as described in more detail below. Particles with relatively small percentages calculated using this method are said to be more indented than particles with relatively large percentages calculated using this method.

Figure 1A:
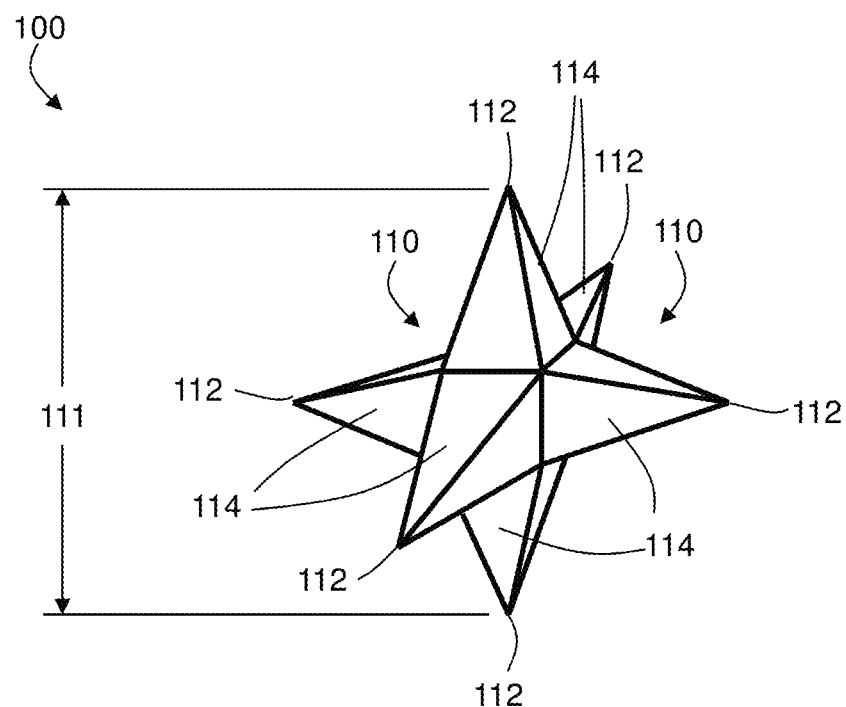
FIGS. 1A-1B are schematic perspective view illustrations of a particle and the convex hull of a particle that can be used, for example, to form a porous support structure, according to certain embodiments.
Figure 1B:
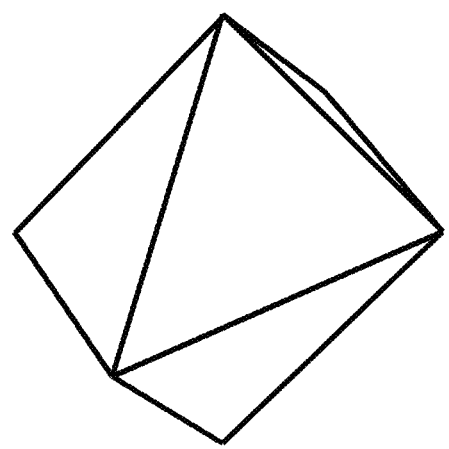
Figure 2A:
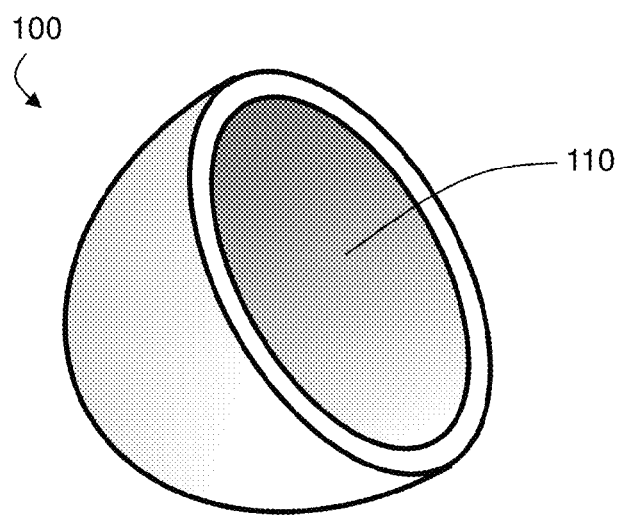
FIGS. 2A-2B are, according to certain embodiments, schematic perspective view illustrations of a particle and the convex hull of a particle that can be used, for example, to form a porous support structure.
Figure 2B:
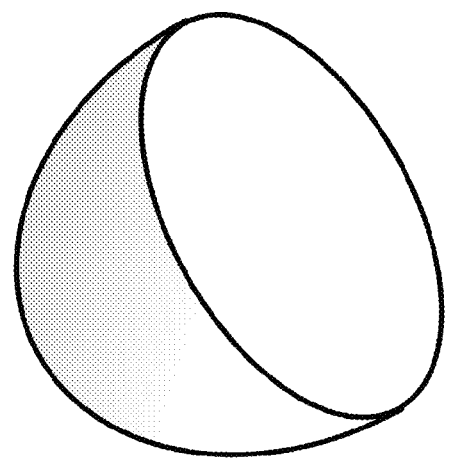

FIGS. 1A-1B are exemplary schematic diagrams illustrating the convex hull of a 3-dimensional 6-pointed star (e.g., in the shape of a jack). The 6-pointed star is illustrated in FIG. 1A. The convex hull of the 6-pointed star, which corresponds to an 8-sided double pyramid, is illustrated in FIG. 1B. FIGS. 2A-2B are exemplary schematic diagrams illustrating the convex hull of a hollowed-out hemisphere. The hollowed-out hemisphere is illustrated in FIG. 2A, while the convex hull (a solid half sphere) is illustrated in FIG. 2B. One of ordinary skill in the art, given the present disclosure, would be capable of determining the size and shape of the convex hull of any given shape.

As used herein, the "external geometric surface" of an article (e.g., a particle, an electrode, etc.) refers to a surface that generally conforms to the outermost boundaries of the article but does not conform to pores or other indentations with maximum external surface cross-sectional dimensions smaller than 10% of the maximum cross-sectional dimension of the article. In many embodiments, the external geometric surface of an article is one that may be measured by a macroscopic measuring tool (e.g., a ruler), and does not include the internal surface area (e.g., area within pores of a porous material such as a porous support structure). The external geometric surface of particle 100 in FIGS. 1A-1B is shown in FIG. 1A. If particle 100 in FIG. 1A were porous, and all of the pores of the particle had cross-sectional dimensions smaller than 10% of the maximum cross-sectional dimension of particle 100 (illustrated as dimension 111 in FIG. 1A), then the external geometric surfaces of the particle 100 would still correspond to the surfaces illustrated in FIG. 1A.

The "geometric particle volume" of a particle is used to refer to the volume that is bounded by the external geometric surfaces of the particle. The "total geometric particle volume" of a plurality of particles refers to the sum of the individual geometric particle volumes of the particles.

The "geometric electrode volume" of an electrode is used to refer to the volume that is bounded by the external geometric surfaces of the electrode. The "geometric porous support structure volume" of a porous support structure is used to refer to the volume that is bounded by the external geometric surfaces of the porous support structure.

The "maximum cross-sectional dimension" of an article (e.g., a particle, an electrode, etc.) refers to the largest distance between two opposed boundaries of the article that may be measured. One of ordinary skill in the art would be capable of measuring the maximum cross-sectional dimension of an article (e.g., an electrode, a particle, etc.), for example, by manual measurement, by analyzing a scanning electron micrograph (SEM) of the article, or by other suitable methods known to those of ordinary skill in the art.

The "maximum external surface cross-sectional dimension" of a pore or other indentation in a particle is the largest dimension between two points of the pore or other feature measured along the geometric surface of the particle. For example, for a 10-micrometer diameter cylindrical pore that extends through the center of a 1 millimeter spherical particle (resulting in a pore with a length of 1 millimeter), the maximum surface cross-sectional dimension of the pore would be 10 micrometers.

Certain embodiments relate to the formation of porous support structures, which comprise a plurality of pores. As used herein, a "pore" refers to a pore as measured using ASTM Standard Test D4284-07, and generally refers to a conduit, void, or passageway, at least a portion of which is surrounded by the medium in which the pore is formed. Generally, voids within a material that are completely surrounded by the material (and thus, not accessible from outside the material, e.g. closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the external geometric surfaces of the individual particles). Pores may comprise any suitable cross-sectional shape including irregular shapes and regular shapes (e.g., substantially circular shapes, substantially elliptical shapes, substantially polygonal shapes, and the like).

As used herein, the "void volume" within a porous support structure refers to portions within the porous support structure that are not occupied by electrode active material, porous support structure particles, binder, or other materials that provide structural support. The void volume within the porous support structure generally includes the volume of the pores in the particles from which the support structure is formed as well as interstices between the particles. One of ordinary skill in the art would be capable of determining the void volume within a porous support structure by performing, for example, mercury intrusion porosimetry according to ASTM Standard Test D4284-07, which is incorporated herein by reference in its entirety for all purposes.

As used herein, the "total porosity percentage" of an article (e.g., a porous support structure, an electrode, etc.) refers to the percentage of the article's geometric volume that is occupied by void volume. For example, the total porosity percentage of a porous support structure would be determined by dividing the void volume of the porous support structure by the geometric porous support structure volume.

In certain embodiments, the particles used to form the electrodes can comprise multiple valence points and/or arms. As used herein, a "valence point" is any location on a particle's external geometric surface at which movement in any direction away from the location and along the particle's external geometric surface results in movement closer to the particle's center of mass. For example, the tip of an arm extending from the central body of a particle is one example of a valence point. The term "valency" is generally used herein to refer to the number of valence points in a structure. For example, a particle with a valency of 3 would have 3 valence points.

In certain embodiments, the particles described herein can comprise multiple supervalence points. The term "supervalence point" is used to describe any valence point that defines the boundary of a convex hull. Examples of supervalence points are illustrated below. Generally, all supervalence points are valence points, but not all valence points are supervalence points. The term "supervalency" is generally used herein to refer to the number of supervalence points in a structure. For example, a particle with a supervalency of 3 would have 3 supervalence points.

U.S. Patent Publication No. 2010/0035128 to Scordilis-Kelley et al. filed on Aug. 4, 2009, entitled "Application of Force in Electrochemical Cells," describes the application of forces in electrochemical cells for improved electrode chemistry, morphology, and/or other characteristics, which can improve performance. For example, some electrochemical cells may undergo a charge/discharge cycle involving stripping and deposition of metal on the surface of an electrode (e.g., stripping and deposition of lithium metal on the surface of a lithium anode). In some cases, the stripping and deposition can be accompanied by parasitic reactions of the metal on the electrode surface with other cell components, such as electrolyte components. One or more surfaces of the electrode may become uneven as the electrochemical cell undergoes repeated charge/discharge cycles, often due to uneven redeposition of an ion dissolved in the electrolyte. The roughening of one or more surfaces of an electrode can result in increasingly poor cell performance. One way to combat the adverse effect of uneven redeposition of electrode active material is to apply an anisotropic force to the affected electrode. However, applying an anisotropic force to one electrode can decrease the pore size and/or void volume of the other electrode. In many electrochemical cells, reducing the pore size and/or void volume of an electrode can degrade cell performance, for example, by limiting the extent to which electrolyte is transported to the electrode active material within the electrode.

Accordingly, it has been recognized that incorporating particles with indentations relative to their convex hulls within an electrode (e.g., the cathode in certain cases where the force is applied to improve the morphology of the anode) can allow for the application of a force to an electrochemical cell without sacrificing the structural integrity (including the porosity and void volume) of the electrode. The particulate materials for use in the electrodes described herein, in certain embodiments, can withstand repeated charging and discharging of the electrochemical cell in which it is located, without sacrificing electrode porosity and void volume, despite dissolution and re-plating of electrode materials. Thus, in certain embodiments, an electrode for use in an electrochemical cell is provided comprising an assembly of particles defining a porous support structure, wherein each particle in the assembly of particles has a geometric particle volume, the assembly of particles has a total geometric particle volume defined by the sum of each of the individual geometric particle volumes, each particle in the assembly of particles has a convex hull defining a convex hull volume, and at least about 50% of the total geometric particle volume is made up of particles that have at least one indentation such that, for each such particle, the geometric particle volume is less than about 75% of the convex hull volume of the particle. In some such embodiments, an electrode active material is substantially contained within pores of the porous support structure.

In certain embodiments, the indentation(s) relative to the convex hull (which indentations can be quantified by dividing the geometric particle volume by the particle's convex hull volume, as described in more detail below) can be formed by one or more external surface portions (i.e., distinct portions of the external surface area). For example, in some embodiments, at least a portion of the indentations can be formed by one or more concave external surface portions of a particle. The indentations can also be formed by convex and/or concave surface portions that extend outward from a central body of the particle.

FIG. 1A is an exemplary perspective view schematic illustration of particle 100 suitable for forming porous support structures and electrodes according to one set of embodiments. In FIG. 1A, particle 100 comprises portions 110, which are indented relative to the convex hull of the particle (illustrated in FIG. 1B). One of ordinary skill in the art would be capable of determining whether a given particle comprises one or more portions that are indented relative to the convex hull of the particle by examining the particle or a magnified image of the particle (e.g., a scanning electron microscope (SEM) image of a microscale or smaller particle).

Referring back to the set of embodiments illustrated in FIG. 1A, particle 100 also includes six valence points 112 at the tip of each six arms 114. Accordingly, particle 100 in FIG. 1A is a "six-valent" particle and has a valency of six. Each of valence points 112 in the particle 100 of FIG. 1A also happen to be supervalency points. Accordingly, particle 100 in FIG. 1A is a "six-supervalent" particle and has a supervalency of six. Particles suitable for use in the electrodes described herein can have any suitable valency and/or supervalency (e.g., a valency and/or supervalency of 3 or more, 4 or more, 5 or more, 6 or more, or 10 or more (and, in certain instances, a valency and/or supervalency of 100 or less)). Particles suitable for use in the electrodes described herein can have any suitable number of arms (e.g., 3 or more, 4 or more, 5 or more, 6 or more, or 10 or more (and, in certain instances, 100 or less)). Particle 100 of FIG. 1A includes the same number of valency and supervalency points. In other cases, the particles used to make the porous support structures described herein have more valency points than supervalency points. For example, in FIG. 3, particle 100C includes four supervalency points 320 and seven total valence points, including valence points 322.

The convex hull of the particle illustrated in FIG. 1A corresponds to an 8-sided polyhedron. In certain embodiments, the convex hulls of the particles within the electrode can comprise a polyhedron with n number of sides, wherein n is between 3 and 20 or between 3 and 10.

Figure 2C:
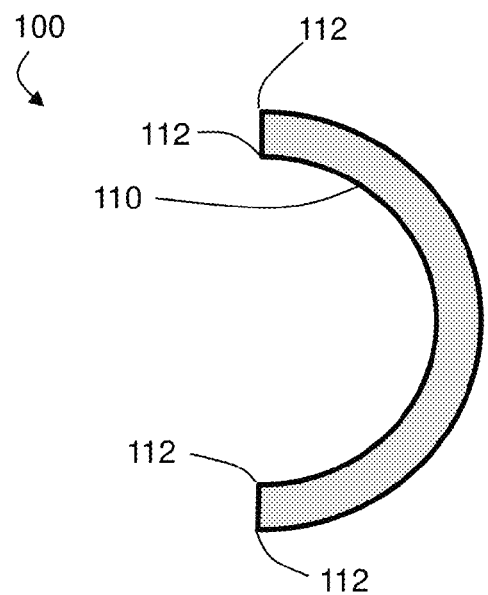
FIGS. 2C-2D are exemplary cross-sectional schematic illustrations of particles that can be used within electrodes.
Figure 2D:
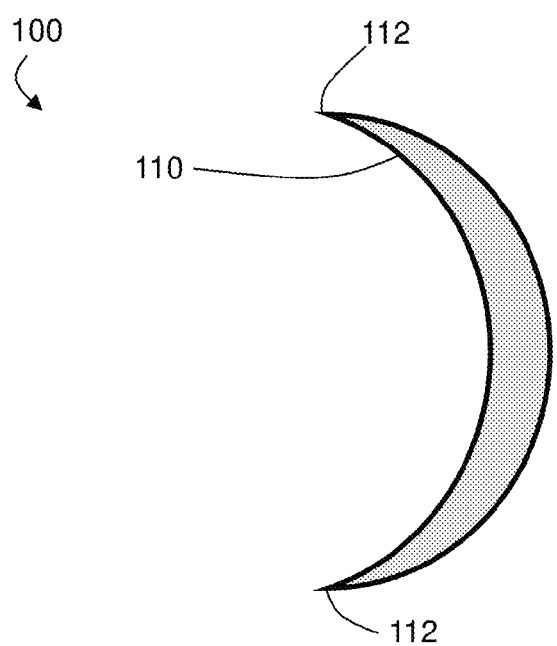

In certain embodiments, the particles within the electrodes described herein can have a single surface portion that is indented relative to the convex hull of the particle. For example, the particles might be half-moon shaped. FIG. 2A is an exemplary perspective view illustration of a particle 100 having a single indented surface portion 110. FIG. 2C is a cross-sectional schematic illustration of the particle shown in FIG. 2A. FIG. 2D is a cross-sectional schematic illustration of another type of particle that can be used in the electrodes described herein. In FIG. 2D, the edges of the particle meet to define a line (shown as a point in the cross-sectional illustration) rather than a flat surface as in FIG. 2C.

In some embodiments, at least a portion of the particles within a porous support structure and/or electrode are substantially in the shape of a spherical cap. A "spherical cap" corresponds to a region of a sphere which lies on one side (e.g., above or below) a plane that intersects the sphere. For example, particle 100 in FIG. 2A corresponds to a spherical cap that defines 50% of a sphere, which results when a plane passes through the center of mass of the sphere. In other embodiments, particles can be substantially in the shape of spherical caps that define more than 10%, more than 20%, or more than 30% of a sphere (and, in some cases, less than 60% of a sphere).

One of ordinary skill in the art, given the present disclosure, would be capable of selecting other types of particles comprising concave external surface portions suitable for use in the electrodes described herein.

Figure 3:
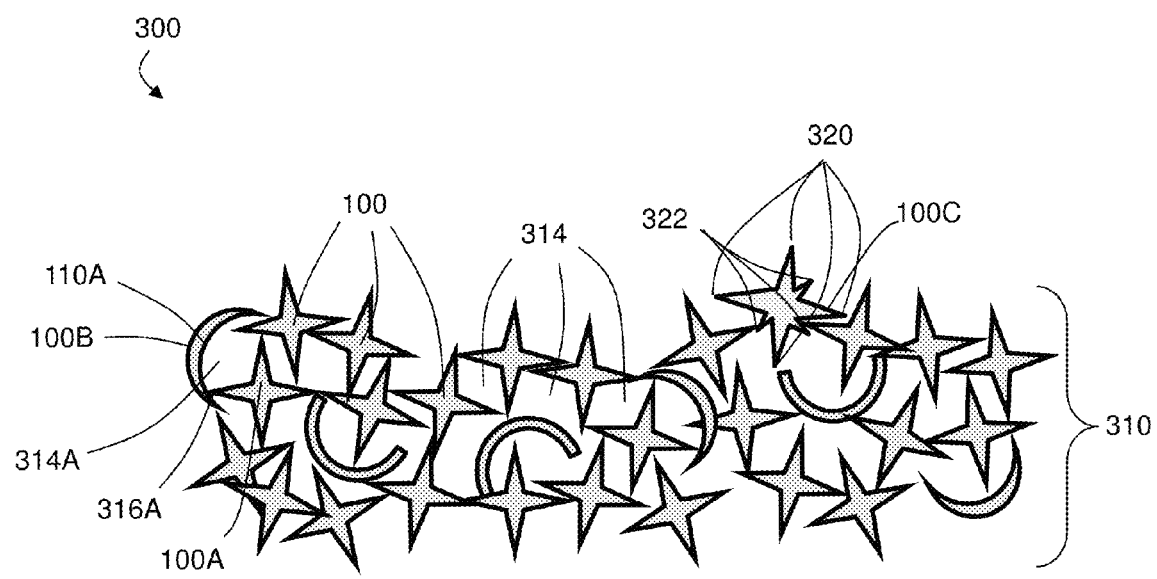
FIG. 3 is a schematic cross-sectional illustration, according to some embodiments, of an assembly of particles forming a porous support structure.

When a plurality of particles such as those illustrated in FIGS. 1A-2D are grouped together to form an assembly, the indentations relative to the convex hull can form "negative space," which can introduce void volume to the assembly. For example, FIG. 3 is a schematic illustration of an assembly 300 of particles 100 comprising indentations relative to their convex hulls forming porous support structure 310. Porous support structure 310 comprises pores 314 formed between particles 100. In certain embodiments, porous support structure 310 comprises part of an electrode. Electrode active material can, in some embodiments, be at least partially contained within pores 314 of porous support structure 310, as described in more detail elsewhere herein. An assembly such as the one illustrated in FIG. 3 can be formed, for example, by suspending the particles within a liquid (e.g., water, methanol, ethanol, isopropanol, propanol, butanol, tetrahydrofuran, dimethoxyethane, acetone, toluene, xylene, acetonitrile, cyclohexane, and the like) and casting the suspension to form a layer of suspension material. After casting the suspension, fluid components can be removed, leaving behind a solid, porous support structure. Optionally, the particles making up the porous support structure can be subject to a compressive force (before and/or after removal of the liquid suspension component) to ensure good contact between the particles after the porous support structure has been hardened. Optionally, electrode active material can be included in the suspension used to form the porous support structure, resulting in the simultaneous deposition of the particles making up the porous support structure and the electrode active material. In other embodiments, the electrode active material can be added to the porous support structure after it has been formed.

In some embodiments, the valence points of particles within the porous support structure can make contact with external surface portions of other particles that are indented relative to their particles' convex hulls (or binder between the valence points and the indented external surface portions) to inhibit or prevent full densification of the assembly, thereby providing porosity and void volume within the final structure. For example, in FIG. 3, valence point 316A of particle 100A is in direct contact with indented external surface portion 110A of particle 100B, thereby defining pore 314A between particles 100A and 100B.

In certain embodiments, the positioning of valence points and indented surface portions in close proximity to (or in contact with) each other can cause overlap of the convex hulls of the particles, at least to some extent. For example, in FIG. 3, the convex hulls of particle 100A and 100B overlap. In certain embodiments, overlap of the convex hulls of particles within a porous support structure can be desirable because it can introduce additional void volume into the porous support structure. In certain embodiments, at least about 5%, at least about 10%, or at least about 20% of the sum of all of the convex hull volumes of all particles within a porous support structure and/or an electrode overlaps with a convex hull volume of another particle.

The overlap of convex hull volumes can lead to an electrode or porous support structure in which the sum of all convex hull volumes within the electrode or porous support structure exceeds the geometric electrode volume and/or the geometric porous support structure volume. In certain embodiments, the sum of all convex hull volumes of the particles within an electrode and/or a porous support structure exceeds the geometric electrode volume and/or the geometric porous support structure of the electrode or porous support by at least about 5%, at least about 10%, at least about 25%, or at least about 50%. One of ordinary skill in the art would be capable of determining the sum of all convex hull volumes within an article by determining the convex hull volume of each particle within the article and summing the individual volumes.

In certain embodiments, particles 100 can be porous, which can introduce additional void volume within porous support structure 310.

The use of particles having relatively large indentations relative to their convex hulls (e.g., rather than particles whose geometric particle volumes occupy a relatively large amount of their convex hull volumes, such as spheres) can be advantageous in certain embodiments. For example, particles having relatively large indentations are generally able to define a given void volume while occupying a relatively small geometric particle volume (relative to particles such as spheres or other particles whose geometric particle volumes occupy a relatively large amount of their convex hull volumes). This can allow one to reduce the amount of mass and/or geometric particle volume defined by the particles within a porous support structure, which can lead to increased energy density and/or specific energy in electrochemical cells in which the porous support structure is employed.

Figure 4A:
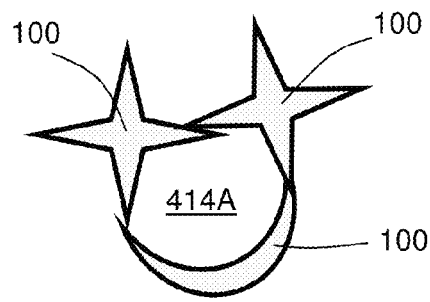
FIGS. 4A-4B are schematic cross-sectional illustrations of exemplary particles.
Figure 4B:
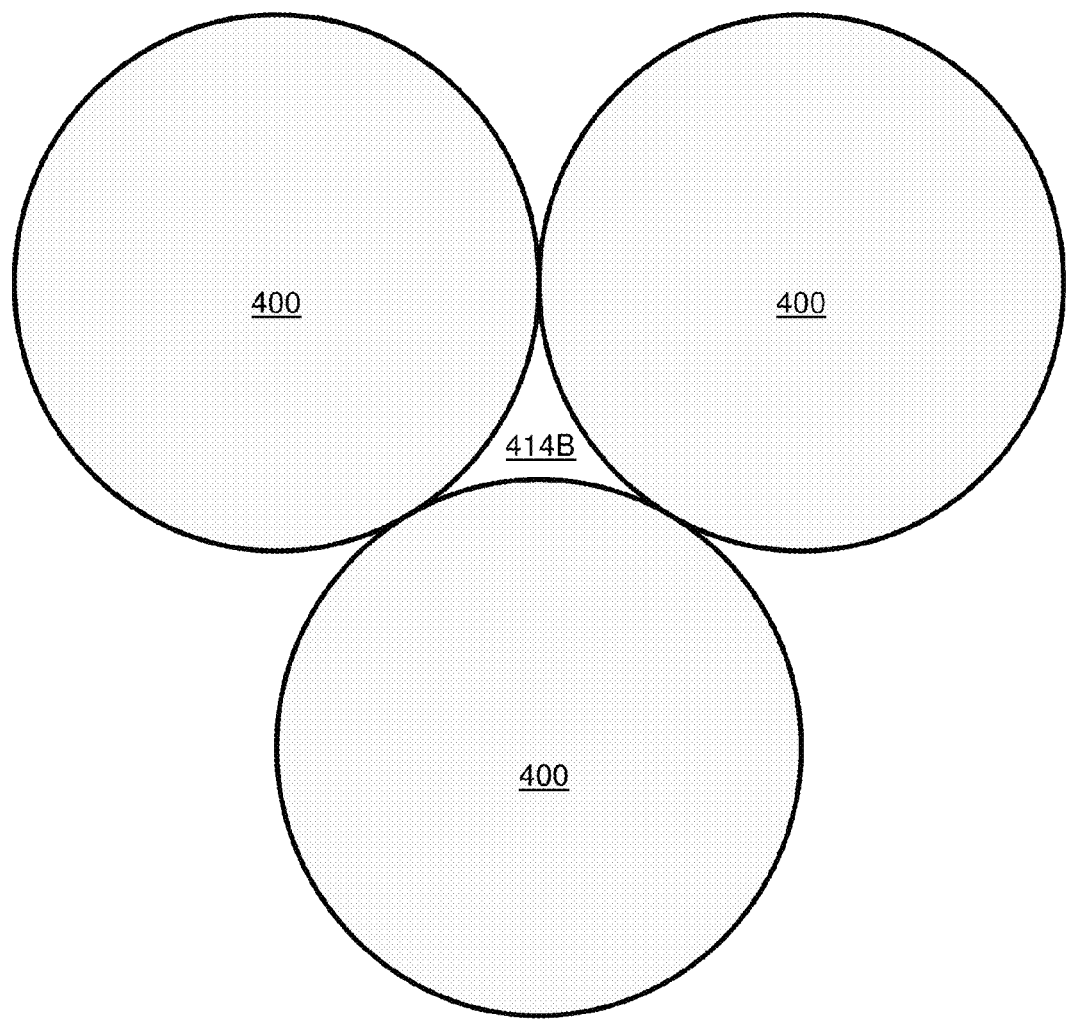

FIGS. 4A-4B are schematic cross-sectional illustrations that illustrate this principle. In FIG. 4A, particles 100 comprising indented surface portions have been assembled to define a pore 414A. In FIG. 4B, substantially spherical particles 400 have been assembled to form pore 414B. While the sizes of pores 414A and 414B are substantially the same, the geometric particle volume defined by particles 100 in FIG. 4A is substantially smaller than the geometric particle volume defined by spherical particles 400 in FIG. 4B.

In certain embodiments, a relatively high percentage of the particles within the porous support structure are shaped such that, for each particle, the geometric particle volume occupies a relatively small amount of the particle's convex hull volume. For example, in certain embodiments, at least about 50%, at least about 75%, at least about 90%, at least about 95%, or at least about 99%, or substantially all of the total geometric particle volume within a porous support structure is made up of particles that are shaped such that, for each particle, the geometric particle volume is less than about 75%, less than about 60%, less than about 50%, less than about 40%, less than about 30%, less than about 20%, less than about 10%, less than about 5%, or less than about 1% (and, in some embodiments, as little as 0.05%) of the convex hull volume of the particle. That is to say, in some embodiments, particles having geometric particle volumes that are less than about 75% (or less than about 60%, less than about 50%, etc.) of their convex hull volumes can occupy at least about 50%, at least about 75%, at least about 90%, at least about 95%, or at least about 99%, or substantially all of the total geometric particle volume within a porous support structure.

One of ordinary skill in the art would be capable of determining whether the geometric particle volume of a given particle is less than a given percentage of that particle's convex hull volume by examining the particle(s) or a magnified image of the particle(s) (e.g., a scanning electron microscope (SEM) image of a microscale or smaller particle). Briefly, such procedure could involve determining the convex hull volume of the particle by examining one or more images of the particle, drawing the convex hull of the particle on the image of the particle, determining the dimensions of the convex hull (using the scale bar on an SEM image to aid in dimension determination, if one or more SEM images is being examined), and calculating the volume of the convex hull using geometric equations known to those of ordinary skill in the art (with the particular equations employed depending upon the shape of the particle). Next, the geometric particle volume would be determined by determining the dimensions of the particle (using the scale bar on an SEM image to aid in dimension determination, if one or more SEM images is being examined) and calculating the geometric particle volume using geometric equations known to those of ordinary skill in the art (again, with the particular equations employed depending upon the shape of the particle). Once the convex hull volume and the geometric particle volume have been determined for a given particle, the percentage of the convex hull volume of a particular particle that is occupied by the geometric particle volume of that particular particle can be determined by dividing the geometric particle volume by the convex hull volume, and multiplying by 100%.

As one example, in the set of embodiments illustrated in FIGS. 1A-1B, particle 100 has a geometric particle volume illustrated in FIG. 1A and a convex hull volume illustrated in FIG. 1B. In FIGS. 1A-1B, particle 100 is shaped such that the geometric particle volume (shown in FIG. 1A) is less than 50% of the convex hull volume (shown in FIG. 1B). As another example, in the set of embodiments illustrated in FIGS. 2A-2B, particle 100 has a geometric particle volume illustrated in FIG. 2A and a convex hull volume illustrated in FIG. 2B. In FIGS. 2A-2B, particle 100 is shaped such that the geometric particle volume (shown in FIG. 2A) is less than 5% of the convex hull volume (shown in FIG. 2B).

In certain embodiments, the void volume of the porous support structure can be maintained or altered only to a limited extent when a compressive force is applied to the porous support structure (and/or an electrode comprising the porous support structure and/or an electrochemical cell comprising an electrode in which the porous support structure is contained). In some embodiments, even if particles within the porous support structure are shifted relative to each other, the void volume within the porous support structure can be maintained, or it can be altered (e.g., increased or decreased) only to a limited extent. For example, referring back to FIG. 3, if particle 100A is rotated counterclockwise relative to particle 100B, valence point 316A can make contact with indented surface portion 110A such that pore 314A remains within the porous support structure to at least some degree. In certain embodiments, the interaction between the valence points and the indented surface portions can ensure that the void volume of the porous support structure is maintained or altered only to a limited extent.

In certain embodiments, the porous support structure can be configured such that, when a compressive force defining a pressure of at least about 20 Newtons/cm², at least about 45 Newtons/cm², at least about 70 Newtons/cm², or at least about 95 Newtons/cm² is applied to the porous support structure (e.g., applied to an electrode and/or an electrochemical cell containing the porous support structure), the void volume of the porous support structure does not change by more than about 25%, by more than about 10%, by more than about 5%, or by more than about 1%, relative to the void volume before the force was applied but under otherwise identical conditions. In certain embodiments, the porous support structure can be configured such that, when a compressive force defining a pressure of from about 20 Newtons/cm² to about 200 Newtons/cm², from about 45 Newtons/cm² to about 200 Newtons/cm², from about 70 Newtons/cm² to about 200 Newtons/cm², or from about 95 Newtons/cm² to about 200 Newtons/cm² is applied to the porous support structure, the void volume of the porous support structure does not change by more than about 25%, by more than about 10%, by more than about 5%, or by more than about 1%, relative to the void volume before the force was applied but under otherwise identical conditions. In this context, "otherwise identical conditions" means conditions that are identical other than the application and/or magnitude of the force. For example, otherwise identical conditions may mean a porous support structure (or electrode and/or electrochemical cell containing the porous support structure) that is identical, but where it is not constructed such that an appreciable force is applied to the porous support structure (or electrode and/or electrochemical cell containing the porous support structure). In certain embodiments, the compressive force can comprise an anisotropic force, such as an anisotropic force with a component normal to the active surface of an electrode, as described in more detail below.

A variety of materials can be used to form the particles for the porous support structures described herein. In certain embodiments, the particles used to form the porous support structure comprise an electrically conductive material, the use of which can enhance the degree to which electrons are transported out of the electrode formed using the porous support structure. Exemplary electrically conductive materials that can be used to form all or part of the particles within the porous support structures described herein include, but are not limited to, carbon, metals (e.g., nickel, copper, magnesium, aluminum, titanium, scandium, iron, alloys and/or other combinations of these), conductive polymers (poly(3,4-ethylenedioxythiphene) (PEDOT), poly(m-ethylenedioxythiophene) (PMDOT), other thiophenes, polyaniline (PANI), polypyrrole (PPy)), and the like. In some embodiments, a metal or metal alloy within the porous support structure (e.g., forming all or part of the components of a porous support structure) can have a density of less than about 9 g/cm³ or less than about 4.5 g/cm³. For example, all or part of the porous support structure can be formed from titanium, which has a bulk density of about 4.5 g/cm³.

In certain embodiments, the electrically conductive porous support structure comprises a material with a bulk electrical resistivity of less than about $10^{-3}$ ohm-m, less than about $10^{-4}$ ohm-m, or less than about $10^{-5}$ ohm-m at 20° C. For example, in some embodiments, all or part of the porous support structure can be formed of graphite, which has a bulk electrical resistivity of between about $2.5 \times 10^{-6}$ and about $5 \times 10^{-6}$ ohm-m at 20° C. and/or nickel, which has a bulk electrical resistivity of about $7 \times 10^{-8}$ ohm-m at 20° C. In certain embodiments, at least about 50 wt %, at least about 75 wt %, at least about 90 wt %, at least about 95 wt %, or at least about 99 wt % of the porous support structure is made up of material(s) having bulk electrical resistivities of less than about $10^{-3}$ ohm-m or less than about $10^{-6}$ ohm-m at 20° C.

In some embodiments, particles used to form a porous support structures can comprise an electrically non-conductive material, such as a non-conductive polymer, a ceramic, a glass, a fabric, or any other suitable non-conductive material. The electrically non-conductive material can be, in certain embodiments, mixed with or at least partially coated with an electrically conductive material to impart the desired level of electrical conductivity. Suitable non-conductive polymers for use in forming particles for porous support structures include, but are not limited to, polyvinyl alcohol (PVA), phenolic resins (novolac/resorcinol), lithium polystyrenesulfonate (LiPSS), epoxies, UHMWPE, PTFE, PVDF, PTFE/vinyl copolymers, co-polymers/block co-polymers of the above and others. In some embodiments, two polymers can be used for their unique funcionalities (e.g. PVA for adhesion, and LiPSS for rigidity, or resorcinol for rigidity and an elastomer for flexibility/toughness).

Suitable ceramics for use in particles of a porous support structure include, but are not limited to, oxides, nitrides, and/or oxynitrides of aluminum, silicon, zinc, tin, vanadium, zirconium, magnesium, indium, and alloys thereof. In some cases, the particles can include any of the oxides, nitrides, and/or oxynitrides above doped to impart desirable properties, such as electrical conductivity; specific examples of such doped materials include tin oxide doped with indium and zinc oxide doped with aluminum. The material used to form the particles of a porous support structure can comprise glass (e.g., quartz, amorphous silica, chalcogenides, and/or other conductive glasses) in some embodiments. The porous support structure can include, in some cases, aerogels and/or xero gels of any of the above materials. In some cases, the porous support structure can include a vitreous ceramic.

The particles of the porous support structures described herein can be formed using a variety of methods. In some embodiments, particles for use in a porous support structure can be formed by combining a first material with a second material, removing at least a portion of the first material from the combination, and breaking up the remaining portions of the second material. In some cases, the structure of the second material can be substantially maintained while the first material is at least partially removed from the combination.

Figure 5:
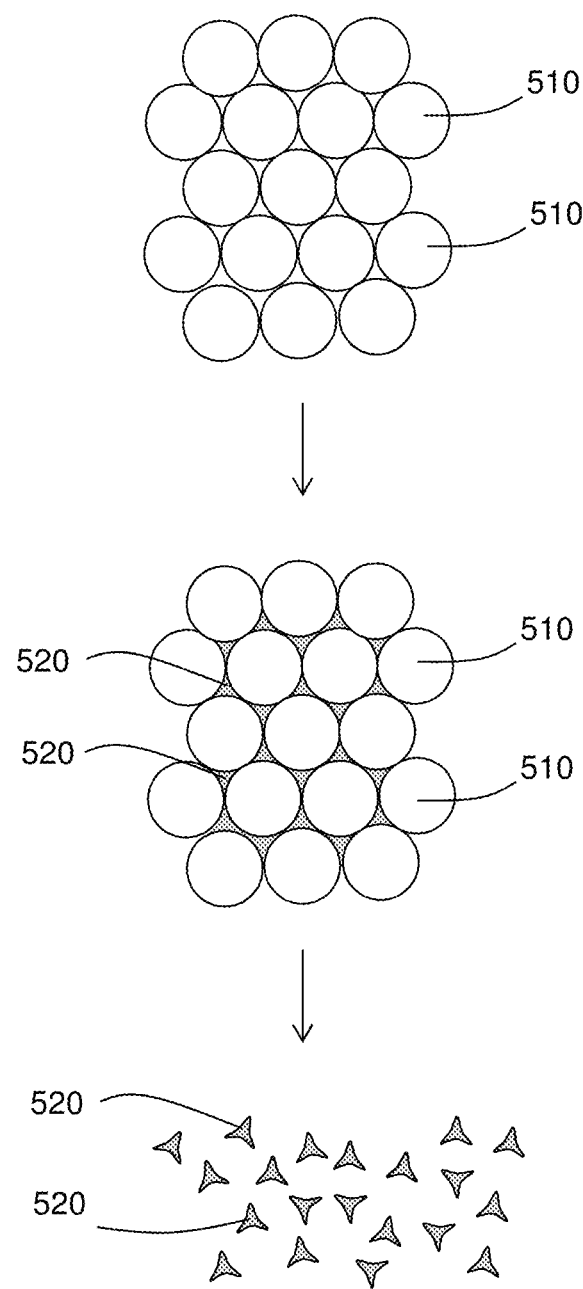
FIG. 5 is a schematic illustration outlining a process for fabricating particles suitable for use within a porous support structure, according to some embodiments.

FIG. 5 is a schematic illustration outlining one process by which support structure particles can be made. In FIG. 5, a plurality of templating elements 510 can be assembled into a template. Material 520, comprising material from which the support structure particles are to be made (e.g., a metal, ceramic, glass, polymer, etc. which might be melted) or a precursor to the support structure material (e.g., which might be converted to form the material of the porous support structure via, for example, a reaction (e.g., polymerization, precipitation, etc.)), can be mixed with templating elements 510. The templating elements can, in certain embodiments, be arranged such that they form an interconnected network, and material 520 can be transported into the interstices of the network. After templating elements 510 have been arranged within the support structure material 520, they can be removed from the support structure material to leave behind pores. In certain embodiments, templating elements 510 include convex external surfaces, and, accordingly, when the templating elements are removed, the remaining material 520 can include concave external surface portions corresponding to the convex external surfaces of the templating elements.

In certain embodiments, support structure material 520 can be added as a liquid and hardened before the templating elements are removed and/or during the removal of the templating elements. As used herein, the term "hardened" is used to refer to the process of substantially increasing the viscosity of a material, and is not necessarily limited to solidifying a material (although in one set of embodiments, a porous support structure material is hardened by converting it into a solid). A material can be hardened, for example, by gelling a liquid phase. In some instances, a material can be hardened using polymerization (e.g., IR- or UV-induced polymerization). In some cases, a material can being hardened can go through a phase change (e.g., reducing the temperature of a material below its freezing point or below its glass transition temperature). A material may also be hardened by removing a solvent from a solution, for example, by evaporation of a solvent phase, thereby leaving behind a solid phase material.

In some embodiments, a precursor of the support structure material can be added between the templating elements and reacted to form the final particle material. In one particular set of embodiments, an organic material can be added between the templating elements, which may subsequently be oxidized and/or pyrolyzed to form a solid carbonaceous material (e.g., carbon black) between the templating elements.

The templating elements can be of any suitable phase. In some cases, the templating elements can be solid particles. For example, the templating elements might comprise silica particles, which can be dissolved out of a porous structure using, for example, hydrofluoric acid. As another example, the templating elements might comprise ammonium bicarbonate, which can be removed by dissolving it in water. In some embodiments, the templating elements can comprise fluid (e.g., liquid and/or gas) bubbles.

The templating elements can also have any suitable shape (regular or irregular). As noted above, in certain embodiments, the templating elements can include one or more convex external surface portions, which can be used to produce the corresponding concave surface portions of the particles produced between the templating elements. Examples of such templating elements include, but not limited to, spheres, cylinders, ellipsoids, irregular shapes, and/or a mixture of these and/or other shapes.

The templating elements may also each be formed of any suitable size. In some embodiments, the size and/or shape of the templating elements can be selected to produce particles having desired sizes and/or indented surface features relative to their convex hulls. In this way, the pore size and void volume of the assembled porous support structure and/or electrode can be controlled by controlling the size, shape, and arrangement of the templating elements (and, therefore, the particles comprising concave external surfaces).

In one set of embodiments, porous support structure particles can be fabricated by producing a monolithic, inorganic, porous matrix material (e.g., comprising silica); infiltrating the pores of the matrix material with carbon or a carbon precursor; optionally pyrolyzing the carbon or carbon precursor material; and dissolving the matrix material to leave behind a templated carbon-based material. For example, when silica is used, the silica can be dissolved using hydrofluoric acid. The templated carbon-based material can subsequently be broken up to form particles comprising indentations relative to their convex hulls.

3D printing is another method that can be used to produce the porous support structure particles described herein. 3D printing is known to those of ordinary skill in the art, and refers to a process by which a three dimensional object is created by shaping successive layers, which are adhered on top of each other to form the final object. 3D printing can be used with a variety of materials, including metals, polymers, ceramics, and others.

In some embodiments, the particles used to form the porous support structures can have maximum cross-sectional dimensions within a designated range. For example, in some cases, at least about 50%, at least about 75%, at least about 90%, at least about 95%, or at least about 99%, or substantially all of the total volume of the particles within a porous support structure can be made up of particles having maximum cross-sectional dimensions of between about 0.1 micrometers and about 10 micrometers, between about 1 micrometer and about 10 micrometers, or between about 1 micrometer and about 3 micrometers. In some embodiments, the particles used to form a porous support structure can have an average maximum cross-sectional dimension of between about 0.1 micrometers and about 10 micrometers, between about 1 micrometer and about 10 micrometers, or between about 1 micrometer and about 3 micrometers.

In certain embodiments, the porous support structures described herein have a relatively high total porosity percentage. For example, in some embodiments, the porous support structure has a total porosity percentage of at least about 50%, at least about 75%, or at least about 90%.

Once particles comprising indentations relative to their convex hulls have been produced, they may be assembled to form a porous support structure. In certain embodiments, at least a portion of the particles within the porous support structure are adhered to another particle via a binder. In some embodiments, at least a portion of the particles within the porous support structure are fused to another particle. In embodiments comprising bound or sintered particles, the particles should be considered separately when determining surface properties (e.g., percentages of convex hulls occupied by geometric particle volumes), maximum cross-sectional dimensions, and the like. Such measurements can be performed by establishing imaginary boundaries between each of the assembled particles, and measuring the properties of the hypothetical, individuated particles that result from establishing such boundaries. The distribution of surface properties, maximum cross-sectional dimensions, and the like can be determined by one of ordinary skill in the art using SEM analysis. The pores of the porous support structure can be at least partially filled with an electrode active material, as described in more detail below, to form a functional electrode. One of ordinary skill in the art would understand that additional components (e.g., current collectors and the like) would be incorporated with the electrode as part of a functioning electrochemical cell.

The distribution of the cross-sectional diameters of the pores within a given porous support structure and/or within the assembled electrode can be chosen to enhance the performance of the electrochemical cell. As used herein, the "cross-sectional diameter" of a pore refers to a cross-sectional diameter as measured using ASTM Standard Test D4284-07, which is incorporated herein by reference in its entirety. The "average cross-sectional diameter" of a plurality of pores refers to the number average of the cross-sectional diameters of each of the plurality of the pores. One of ordinary skill in the art would be capable of calculating the distribution of cross-sectional diameters and the average cross-sectional diameter of the pores within a porous structure (e.g., a small-scale porous support structure, a large scale porous support structure, and electrode assembled from a combination of porous support structures) using mercury intrusion porosimetry as described in ASTM Standard Test D4284-07. For example, the methods described in ASTM Standard Test D4284-07 can be used to produce a distribution of pore sizes plotted as the cumulative intruded pore volume as a function of pore diameter. To calculate the percentage of the total pore volume within the sample that is made up of pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM Standard Test D4284-07, porosimetry measurements may be supplemented using Brunauer-Emmett-Teller (BET) surface analysis, as described, for example, in S. Brunauer, P. H. Emmett, and E. Teller, *J. Am. Chem. Soc.,* 1938, 60, 309, which is incorporated herein by reference in its entirety.

In certain embodiments, a porous support structure and/or an assembled electrode can be configured to comprise pores with cross-sectional diameters that are larger than sub-nanometer scale and single nanometer scale pores, which can be relatively easily clogged with electrochemical cell reaction by-product and/or can be too small to allow for the passage of electrolyte (e.g., liquid electrolyte) into the pores of the electrode due to, for example, capillary forces. In addition, in some cases, the pores within a porous support structure and/or within an assembled electrode may have cross-sectional diameters that are smaller than millimeter-scale pores, which may be so large that they render the electrode mechanically unstable.

In some embodiments, the total pore volume of a porous structure is described. In such embodiments, the porous support structure can be said to comprise a plurality of pores, wherein each pore of the plurality of pores has a pore volume, and the plurality of pores has a total pore volume defined by the sum of each of the individual pore volumes. In certain embodiments, at least about 50%, at least about 75%, at least about 90%, at least about 99%, or substantially all of the total pore volume within the assembled electrode is defined by pores having cross-sectional diameters of between about 0.1 micrometers and about 10 micrometers, or between about 1 micrometer and about 3 micrometers. In some embodiments, the average cross-sectional diameter of the pores within the assembled electrode is between about 0.1 micrometers and about 10 micrometers, or between about 1 micrometer and about 3 micrometers.

Generally, the porosity (e.g., distribution of pores, distribution of pore sizes, void volume, etc.) of an assembled electrode is determined in the absence of electrode active material within the pores of the electrode. This can be achieved, for example, by removing the electrode active material from the pores of the electrode and subsequently performing mercury intrusion porosimetry and/or by performing porosimetry before electrode active material has been added to the electrode.

In some embodiments, the assembled electrode may comprise pores with relatively uniform cross-sectional diameters. Not wishing to be bound by any theory, such uniformity may be useful in maintaining relatively consistent structural stability throughout the bulk of the porous electrode. In addition, the ability to control the pore size to within a relatively narrow range can allow one to incorporate a large number of pores that are large enough to allow for fluid penetration (e.g., electrolyte penetration) while maintaining sufficiently small pores to preserve structural stability. In some embodiments, the distribution of the cross-sectional diameters of the pores within an assembled electrode can have a standard deviation of less than about 50%, less than about 25%, less than about 10%, less than about 5%, less than about 2%, or less than about 1% of the average cross-sectional diameter of the plurality of pores.

Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

In certain embodiments, an electrode active material can be substantially contained within pores of the porous support structures described herein. The electrode active material can be added to form electrodes using the porous support structure. A first material that is said to be "substantially contained" within the pores of a second material is one that at least partially lies within the imaginary volumes defined by the outer boundaries of the pores of the second material. For example, a material substantially contained within a pore can be fully contained within the pore, or may only have a fraction of its volume contained within the pore, but a substantial portion of the material, overall, is contained within the pore. In certain embodiments, a first material (e.g., an electrode active material) is at least partially contained within the pores of a second material (e.g., a porous support structure) when at least about 30 wt %, at least about 50 wt %, at least about 70 wt %, at least about 80 wt %, at least about 85 wt %, at least about 90 wt %, at least about 95 wt %, or substantially all of the first material lies within the imaginary volume defined by the outer boundaries of the pores of the second material.

A variety of electrode active materials can be used in association with the electrodes described herein. In certain embodiments (e.g., in some embodiments in which the electrode is used as a cathode), the electrode active material within the pores can comprise sulfur. For example, the electrode active material within the pores can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as the active cathode species, is described predominately, it is to be understood that wherever sulfur is described as a component of the electrode active material herein, any suitable cathode active species may be used. For example, in certain embodiments, the cathode active species comprises a hydrogen-absorbing alloy, such as those commonly used in nickel metal hydride batteries. One of ordinary skill in the art, given the present disclosure, would be capable of extending the ideas described herein to electrochemical cells containing electrodes employing other cathode active materials.

In certain embodiments in which sulfur is used as a cathode active material, the anode can comprise lithium as an anode active material. Suitable electrode active materials comprising lithium include, but are not limited to, lithium metal such as lithium foil and lithium deposited onto a conductive substrate, and lithium alloys (e.g., lithium-aluminum alloys and lithium-tin alloys). In some embodiments, an electroactive lithium-containing material of an anode active layer comprises greater than 50 wt % lithium. In some cases, the electroactive lithium-containing material of an anode active layer comprises greater than 75 wt % lithium. In still other embodiments, the electroactive lithium-containing material of an anode active layer comprises greater than 90 wt % lithium.

In certain embodiments, the porous support structures comprising particles with indentations relative to their convex hull can be included in an anode. Examples of anode active materials that can be used include, but are not limited to, alkali metals (e.g., lithium, sodium, potassium, rubidium, caesium, francium), alkaline earth metals (e.g., beryllium, magnesium, calcium, strontium, barium, radium), and the like.

The electrode and porous support structure configurations described herein can be used in electrochemical cells for a wide variety of devices, such as, for example, electric vehicles, load-leveling devices (e.g., for solar- or wind-based energy platforms), portable electronic devices, and the like. The term "electrochemical cell" includes primary and secondary electrochemical cells. Accordingly, the inventive electrochemical cell arrangements and materials described herein can be used in primary cells and/or in secondary cells (including primary batteries and secondary batteries), which can be charged and discharged numerous times. In some embodiments, the materials, systems, and methods described herein can be used in association with lithium-based electrochemical cells, and batteries thereof. For example, in certain embodiments, the electrodes comprising the porous support structures described herein can be used in electrochemical cells comprising another electrode comprising lithium, such as lithium metal and/or a lithium alloy.

Figure 6:
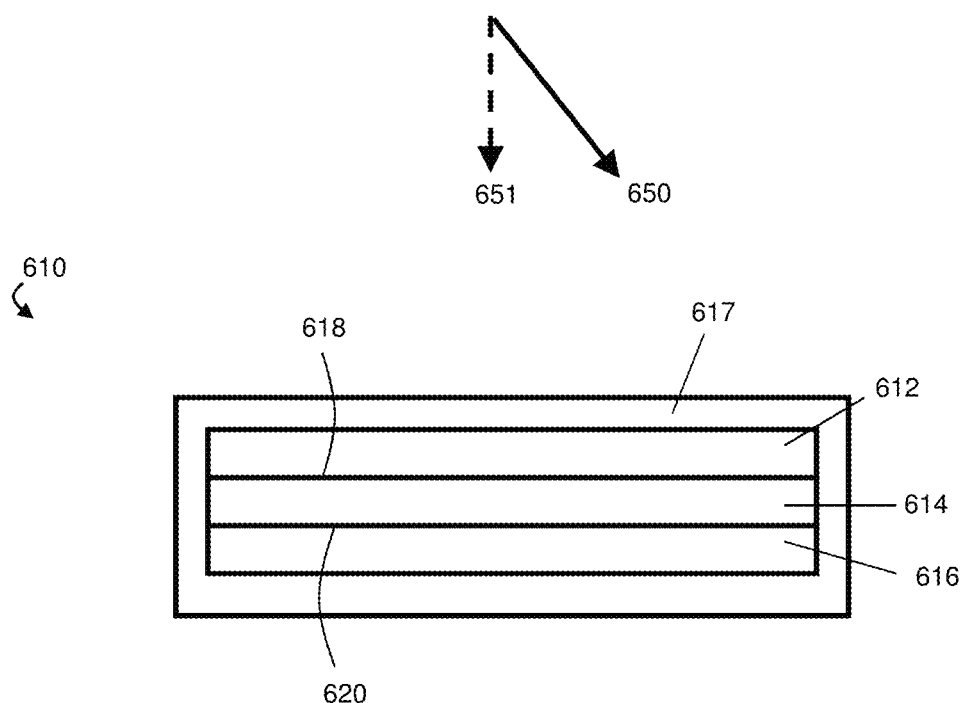
FIG. 6 is an exemplary cross-sectional schematic illustration, according to certain embodiments, of an electrochemical cell.

Although the present invention can find use in a wide variety of electrochemical devices, an example of one such device is provided in FIG. 6 for illustrative purposes only. FIG. 6 includes a schematic illustration of an electrochemical cell 610 comprising a cathode 612 and an anode 616. In addition, the electrochemical cell comprises electrolyte 614. The electrolyte can include one or more components in electrochemical communication with the cathode and the anode. While the anode, cathode, and electrolyte in FIG. 6 are shown as having a planar configuration, other embodiments may include non-planar configurations (e.g., cylindrical, serpentine, etc.). In the set of embodiments illustrated in FIG. 6, electrochemical cell 610 also includes a housing structure 617.

Of course, the orientation of the components can be varied, and it should be understood that there are other embodiments in which the orientation of the layers is varied. Additionally, non-planar arrangements, arrangements with proportions of materials different than those shown, and other alternative arrangements are useful in connection with the present invention. A typical electrochemical cell also would include, of course, current collectors, external circuitry, and the like. Those of ordinary skill in the art are well aware of the many arrangements that can be utilized with the general schematic arrangement as shown in the figures and described herein.

Electrodes comprising the porous support structures described herein (including, for example, an assembly of particles comprising indentations relative to their convex hull) can be used as anodes and/or cathodes. In certain embodiments, cathode 612 of electrochemical cell 610 can comprise a porous support structure comprising a plurality of particles comprising indentations relative to their convex hulls. In some such embodiments, anode 616 comprises lithium (e.g., lithium metal and/or a lithium alloy) as an active species.

In certain embodiments, the porous support structures and electrodes described herein can be configured for use in electrochemical cells in which an anisotropic force is applied to the cell. Accordingly, in certain embodiments, the porous support structures and electrodes described herein can be configured to withstand an applied anisotropic force (e.g., a force applied to enhance the morphology of the other electrode) while maintaining their structural integrity (including void volume, in certain embodiments). For example, in certain embodiments, the porous support structures and electrodes can be part of an electrochemical cell that is constructed and arranged to apply, during at least one period of time during charge and/or discharge of the cell, an anisotropic force with a component normal to the active surface of an electrode within the electrochemical cell (e.g., an anode comprising lithium metal and/or a lithium alloy). In one set of embodiments, the applied force can be selected to enhance the morphology of an electrode (e.g., an anode such as a lithium metal and/or alloy anode), and the cathode can comprise multiple particles comprising external surface portions with indentations relative to the convex hulls of the particles.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

In certain such cases, the anisotropic force comprises a component normal to an active surface of an electrode within an electrochemical cell. As used herein, the term "active surface" is used to describe a surface of an electrode that is in physical contact with the electrolyte and at which electrochemical reactions may take place. For example, referring back to FIG. 6, cathode 612 can include cathode active surface 618 and/or anode 616 can include anode active surface 620. One of ordinary skill in the art would understand that an active surface of an electrode refers to an external geometric surface of the electrode.

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

An applied force with a component normal to an active surface of an electrode is illustrated in FIG. 6. In FIG. 6, an anisotropic force may be applied in the direction of arrow 650. Arrow 651 illustrates the component of force 650 that is normal to active surface 620 of anode 616 (and also, in this case, normal to active surface 618 of cathode 612). In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode. In some embodiments, the anisotropic force is applied uniformly over the active surface of the anode.

Any of the electrode properties (e.g., porosities, pore size distributions, etc.) and/or performance metrics described herein may be achieved, alone or in combination with each other, while an anisotropic force is applied to the electrochemical cell (e.g., during charge and/or discharge of the cell). In certain embodiments, the anisotropic force applied to porous support structure, to the electrode, and/or to the electrochemical cell containing the electrode (e.g., during at least one period of time during charge and/or discharge of the cell) can include a component normal to an active surface of an electrode (e.g., an anode such as a lithium metal and/or lithium alloy anode within the electrochemical cell and/or the porous electrode comprising multiple porous support structures). In certain embodiments, the component of the anisotropic force that is normal to the active surface of the electrode defines a pressure of at least about 20, at least about 25, at least about 35, at least about 40, at least about 50, at least about 75, at least about 90, at least about 100, at least about 125 or at least about 150 Newtons per square centimeter, while the desired electrode properties are present. In certain embodiments, the component of the anisotropic force normal to the active surface may, for example, define a pressure of less than about 200, less than about 190, less than about 175, less than about 150, less than about 125, less than about 115, or less than about 110 Newtons per square centimeter, while the desired electrode properties are present. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

In certain embodiments, the void volumes and/or pore distributions described herein can be achieved while an anisotropic force (e.g., having a component normal to an active surface of an electrode that defines a pressure of between about 20 Newtons/cm$^2$ and about 200 Newtons/cm$^2$, or within any of the ranges outlined above) is applied to the electrode (e.g., via application of an anisotropic force to an electrochemical cell containing the electrode). This can be accomplished by fabricating a porous support structure within the electrode that is capable of maintaining its porosity under an applied force, as described above. A porous support structure that resists deformation under an applied force can allow the electrode containing the porous support structure to maintain its permeability under pressure, and can allow the electrode to maintain the enhanced rate capabilities described herein. In some embodiments, the yield strength of a porous support structure (e.g., a large scale porous support structure) and/or the yield strength of the resulting electrode produced from the porous support structure can be at least about 200 Newtons/cm$^2$, at least about 350 Newtons/cm$^2$, or at least about 500 Newtons/cm$^2$.

The anisotropic forces described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. patent application Ser. No. 12/535,328, filed Aug. 4, 2009, entitled "Application of Force in Electrochemical Cells" to Scordilis-Kelley et al. which are incorporated herein by reference in their entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrode for use in an electrochemical cell, comprising:
    an assembly of particles defining a porous support structure, wherein:
        each particle in the assembly of particles has a geometric particle volume,
        the assembly of particles has a total geometric particle volume defined by the sum of each of the individual geometric particle volumes,
        each particle in the assembly of particles has a convex hull defining a convex hull volume, and
        at least about 50% of the total geometric particle volume is made up of particles that have at least one indentation such that, for each such particle, the geometric particle volume is less than about 75% of the convex hull volume of the particle; and
    an electrode active material substantially contained within pores of the porous support structure.

2. The electrode of claim 1, wherein, when a compressive force defining a pressure of at least about 20 Newtons/cm$^2$ is applied to the electrode, the void volume of the porous support structure does not change by more than about 25% relative to the void volume of the porous support structure before the force was applied but under otherwise essentially identical conditions.

3. The electrode of claim 1, wherein at least about 75% of the total geometric particle volume is made up of particles that are shaped such that, for each particle, the geometric practice volume is less than about 75% of the convex hull volume.

4. The electrode of claim 1, wherein the electrode active material comprises sulfur.

5. The electrode of claim 4, wherein the sulfur comprises elemental sulfur, polymeric sulfur, an inorganic sulfide, an inorganic polysulfide, an organic sulfide, an organic polysulfide, and/or a sulfur organic compound.

6. The electrode of claim 1, wherein at least a portion of the particles comprise an electrically conductive material.

7. The electrode of claim 6, wherein the electrically conductive material comprises carbon and/or a metal.

8. The electrode of claim 1, wherein:
    each pore of the plurality of pores has a pore volume, and the plurality of pores has a total pore volume defined by the sum of each of the individual pore volumes; and
    at least about 50% of the total pore volume is defined by pores having cross-sectional diameters of between about 0.1 micrometers and about 10 micrometers.

9. The electrode of claim 1, wherein at least a portion of the particles within the assembly are adhered to another particle via a binder and/or at least a portion of the particles within the assembly are fused to another particle.

10. The electrode of claim 1, wherein at least a portion of the particles are substantially in the shape of a spherical cap.

11. The electrode of claim 1, wherein at least a portion of the particles comprise at least three valence points.

12. The electrode of claim 1, wherein the porous support structure has a total porosity percentage of at least about 50%.

13. An electrochemical cell comprising the electrode of claim 1.

14. The electrochemical cell of claim 13, wherein the electrochemical cell comprises a second electrode comprising lithium.

15. The electrochemical cell of claim 14, wherein the second electrode comprises lithium metal and/or a lithium alloy.

* * * * *

UNITED STATES PATENT AND TRADEMARK OFFICE
CERTIFICATE OF CORRECTION

| | | |
|---|---|---|
| PATENT NO. | : 9,577,267 B2 | Page 1 of 1 |
| APPLICATION NO. | : 14/743304 | |
| DATED | : February 21, 2017 | |
| INVENTOR(S) | : Chariclea Scordilis-Kelley et al. | |

It is certified that error appears in the above-identified patent and that said Letters Patent is hereby corrected as shown below:

In the Claims

Column 22, Claim 3, Lines 1-2, the phrase "geometric practice volume" should be "geometric particle volume"

Signed and Sealed this
Thirteenth Day of June, 2017

Joseph Matal
*Performing the Functions and Duties of the
Under Secretary of Commerce for Intellectual Property and
Director of the United States Patent and Trademark Office*